United States Patent [19]

Su et al.

[11] Patent Number: 5,234,478
[45] Date of Patent: Aug. 10, 1993

[54] FUEL ADDITIVE METHOD OF PREPARATION AND MOTOR FUEL COMPOSITION

[75] Inventors: Wei-Yang Su, Austin, Tex.; Sheldon Herbstman, New City, N.Y.; Robert L. Zimmerman, Austin, Tex.; Michael Cuscurida, Austin, Tex.; Wheeler C. Crawford, Houston, Tex.; Daniel T. Daly, Shaker Heights, Ohio

[73] Assignees: Texaco Inc.; Texaco Chemical Co., both of White Plains, N.Y.

[21] Appl. No.: 896,700

[22] Filed: Jun. 10, 1992

[51] Int. Cl.$^5$ .................. C10L 1/22; C07C 103/76
[52] U.S. Cl. ........................ 44/419; 44/418; 564/193; 564/194; 564/196
[58] Field of Search ............... 44/418, 419; 564/193, 564/194, 196

[56] References Cited

U.S. PATENT DOCUMENTS

| | | | |
|---|---|---|---|
| 3,510,282 | 5/1970 | Seffens | 44/419 |
| 4,060,553 | 11/1977 | Redmore et al. | 564/193 |
| 4,146,556 | 3/1979 | Redmore et al. | 564/196 |
| 4,427,562 | 1/1984 | Horodysky et al. | 44/418 |
| 4,518,782 | 5/1985 | Sung et al. | 44/419 |
| 4,568,358 | 2/1986 | Courtney | 44/419 |

*Primary Examiner*—Ellen McAvoy
*Attorney, Agent, or Firm*—James J. O'Loughlin; Robert B. Burns

[57] ABSTRACT

An amido alkanolamine composition obtained by reacting, at a temperature of 10° C.–200° C.:

(a) a 4-alkyl-2-morpholinone represented by the formula:

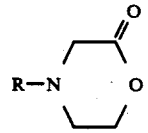

in which R represents a monovalent aliphatic radical having from 1 to 10 carbon atoms, and (b) an alkylphenoxypolyoxyalkylene amine represented by the formula:

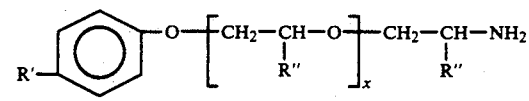

in which R' represents a hydrocarbyl radical having from 4 to 30 carbon atoms, x has a value from 5 to 50, and R" represents a methyl radical or a mixture of hydrogen and methyl radicals is provided.

12 Claims, No Drawings

FUEL ADDITIVE METHOD OF PREPARATION AND MOTOR FUEL COMPOSITION

BACKGROUND OF THE INVENTION

Field of the Invention

This invention relates to a novel additive composition for use in motor fuels. The additive comprises the reaction product obtained by reacting a 4-alkyl-2-morpholinone with an alkylphenoxypolyoxyalkylene amine to produce a motor fuel—soluble amido alkanolamine compound which provides a number of valuable properties in a motor fuel composition.

The combustion of a hydrocarbon motor fuel in an internal combustion engine leads to the formation and accumulation of deposits on various parts of the combustion chamber as well as on the fuel intake and exhaust system of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs causing engine knock. In addition, the accumulation of deposits within the combustion chamber reduces the volume of the combustion zone, causing a higher than design compression ratio in the engine. This, in turn, can also lead to engine knocking. A knocking engine does not effectively utilize the energy of combustion. Moreover, a prolonged period of engine knocking can cause stress fatigue and wear in pistons, connecting rods, bearings and cam rods of the engine. The phenomenon noted is characteristic of gasoline powered internal combustion engines. It may be overcome by employing a higher octane gasoline which resists knocking for powering the engine. This need for a higher octane gasoline as mileage accumulates has become known as the engine octane requirement increase (ORI) phenomenon. It is particularly advantageous if engine ORI can be substantially reduced or eliminated by preventing or modifying deposit formation in the combustion chambers of the engine.

Another problem common to internal combustion engines is the formation of intake valve deposits. Intake valve deposits interfere with valve closing and eventually will lead to valve burning. Such deposits interfere with valve motion and valve seating and tend to reduce the volumetric efficiency of the engine and to limit the maximum design power. Valve deposits may be produced from thermally and oxidatively unstable fuel or from lubricating oil oxidation products. The hard carbonaceous deposits produced collect in the tubes and runners that are part of the exhaust gas recirculation (EGR) flow. These deposits are believed to be formed from exhaust particles which are subjected to rapid cooling while mixing with the air-fuel mixture. Reduced EGR flow can result in engine knock and in nitric oxide, $NO_x$, emission increases. It would therefore be desirable to provide a motor fuel composition which minimizes or overcomes the formation of intake valve deposits.

2. Disclosure Statement

U.S. 4,747,851 discloses a novel polyoxyalkylene diamine compound of the formula:

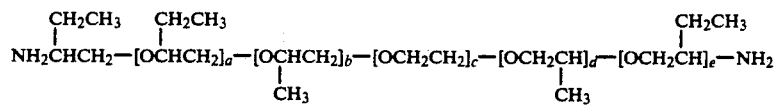

where c has a value from about 5-150, b+d has a value from about 5-150, and a+e has a value from about 2-12. Motor fuel compositions comprising the novel polyoxyalkylene diamine, alone or in combination with a polymer/copolymer additive are also disclosed.

U.S. 4,659,337 discloses the use of the reaction product of maleic anhydride, a polyether polyamide containing oxyethylene and oxypropylene ether moieties, and a hydrocarbyl polyamine in a gasoline motor fuel to reduce engine ORI and provide carburetor detergency.

U.S. 4,659,336 discloses the use of the mixture of (i) the reaction product of maleic anhydride, a polyether polyamine containing oxyethylene and oxypropylene ether moieties and a hydrocarbyl polyamine, and (ii) a polyolefin polymer/copolymer as an additive in motor fuel compositions to reduce engine ORI.

U.S. 4,631,069 discloses an alcohol-containing motor fuel composition which additionally comprises an antiwear additive which is the reaction product of a dibasic acid anhydride, a polyoxyisopropylene diamine of the formula:

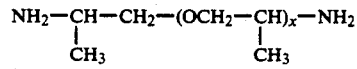

where x has a value of 2-68, and an N-alkyl-alkylene diamine.

U.S. 4,643,738 discloses a motor fuel composition comprising a deposit-control additive which is the reaction product of a dibasic acid anhydride, a polyoxyisopropylene diamine of the formula:

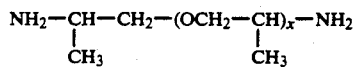

where x has a value of 2-50, and an N-alkyl-alkylene diamine.

U.S. 4,604,103 discloses a motor fuel deposit control additive for use in internal combustion engines which maintains cleanliness of the engine intake system without contributing to combustion chamber deposits or engine ORI. The additive disclosed is a hydrocarbyl polyoxyalkylene polyethylene amine of molecular weight range 300-2,500 having the formula:

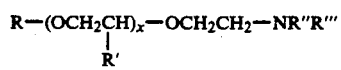

where R is a hydrocarbyl radical of from 1 to about 30 carbon atoms; R' is selected from methyl and ethyl; x is an integer from 5 to 30, and R' and R''' are independently selected from hydrogen and —(CH$_2$CH$_2$N-H)$_y$—H, where y is an integer from 0 to 5.

U.S. 4,581,040 discloses the use of a reaction product as a deposit-inhibitor additive in fuel compositions. The reaction product is the condensation product of the process comprising (i) reacting a dibasic acid anhydride with a poly-oxyisopropylene diamine of the formula:

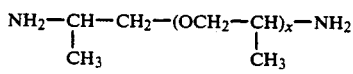

where x is a numeral of about 2-14 50, thereby forming a bismaleamic acid; (ii) reacting said maleamic acid with a polyalkylene polyamine, thereby forming a condensate product; and (iii) recovering said condensate product.

U.S. 4,357,148 discloses a motor fuel additive useful in controlling ORI which is the combination of (a) an oil-soluble aliphatic polyamine containing at least one olefinic polymer chain, and (b) a polymer, copolymer, or corresponding hydrogenated polymer or copolymer of a $C_2$-$C_6$ mono-olefin with a molecular weight of 500-1,500.

U.S. 4,234,321 discloses a hydrocarbylpoly(oxyalkylene) ureylene carbamate as a deposit control additive for fuels.

EP 297996 discloses an alkylphenylpoly(oxypropylene) aminocarbamate having a molecular weight ranging from 600 to 6000 for use in gasoline or diesel fuel compositions.

An object of this invention is to provide a novel additive reaction product which may be employed in fuel compositions and particularly in a motor fuel composition.

Another object is to provide a fuel additive reaction product and a motor fuel composition which inhibits the formation of intake valve deposits in an internal combustion engine.

Another object of this invention is to provide a fuel additive and a fuel composition which inhibits or reduces the formation of combustion chamber deposits in an internal combustion engine.

Yet another object of this invention is to provide a concentrate composition which may be added to a motor fuel to provide motor fuel compositions of the instant invention.

SUMMARY OF THE INVENTION

The intake valve and combustion chamber deposit-inhibiting additive of the invention is the reaction product prepared by reacting a 4-alkyl-2-morpholinone with an alkylphenoxypolyoxy-alkylene amine. The 4-alkyl-2-morpholinone reactant used to prepare the reaction product additive of the instant invention may be represented by the formula:

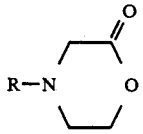

in which R represents a monovalent aliphatic radical having from 1 to 10 carbon atoms.

The alkylphenoxypolyoxyalkylene amine reactant may be represented by the formula:

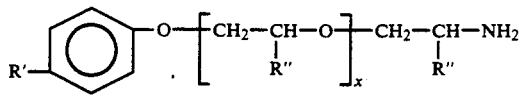

in which R' represents a hydrocarbyl radical having from 4 to 30 carbon atoms, x has a value from about 5 to 50, and R" represents a methyl radical or a mixture of hydrogen and methyl radicals.

The final reaction product may be represented by the formula:

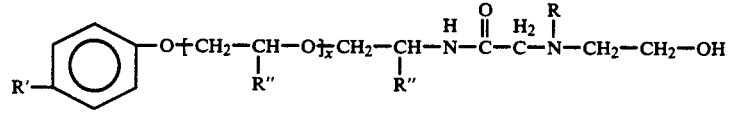

in which R, R', R", and x have the values noted above.

The motor fuel composition of the invention comprises a mixture of hydrocarbons in the gasoline boiling range and a minor amount of the prescribed intake valve and combustion chamber deposit-inhibiting emulsion resistant additive of the invention.

DETAILED DESCRIPTION OF THE INVENTION

The intake valve and combustion chamber deposit-inhibiting additive of the invention is the reaction product of a 4-alkyl-2-morpholinone and an alkylphenoxypolyoxyalkylene amine. The 4-alkyl-2-morpholinone used to prepare the reaction product additive of the instant invention may be represented by the formula:

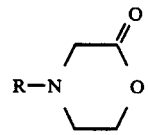

in which R represents a monovalent aliphatic radical having from 1 to 10 carbon atoms. Preferably, R is an alkyl radical having from 1 to 4 carbon atoms and most preferably having from 1 to 3 carbon atoms. Specific compounds within the scope of the formula include 4-methyl-2-morpholinone, 4-ethyl-2-morpholinone, and 4-isopropyl-2-morpholinone.

The alkylphenoxypolyoxyalkylene amine reactant is represented by the formula:

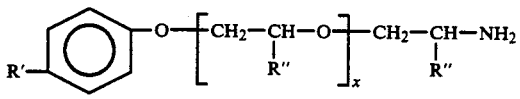

in which R' is a hydrocarbyl radical having from about 4 to 30 carbon atoms, x represents a number from about 4 to 50, and R" represents a methyl radical or a mixture of hydrogen and methyl radicals. Preferably, R' represents a monovalent aliphatic radical having from about 6 to 24 carbon atoms, and more preferably an aliphatic radical having from about 8 to 20 carbon atoms. A particularly preferred value for R' is from 9 to 18 carbon atoms. A preferred value for x is from about 6 to 30, with the most preferred value being from about 10 to 20.

As indicated above, the internal radical represented by the formula:

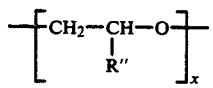

preferably may be a propylene oxide radical or a mixture of propylene oxide and ethylene oxide radicals. When a mixture of propylene oxide and ethylene oxide radicals are used, the ratio of propylene oxide radicals to ethylene oxide radicals employed may range from about 2:3 to 9.99:0.01. A more preferred mole ratio range of propylene oxide to ethylene oxide is from about 7:3 to 9.99:0.01.

The 4-alkyl-2-morpholinone reactant and the alkylphenoxy-polyoxyalkylene amine reactant are reacted in about a 1:1 mole ratio. While other mole ratios are contemplated, no significant advantage is realized in departing from about equimolar reaction ratios.

The additive reaction product of the invention may be represented by the formula:

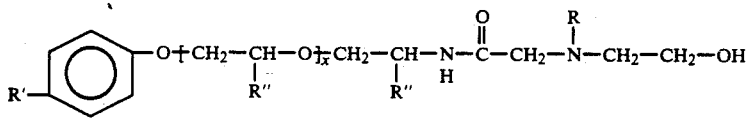

in which R, R', R" and x have the values noted above.

The following examples illustrate the preparation of the additive of the invention.

EXAMPLE I

A. Preparation of 13.5 Mole Propylene Oxide Adduct of Nonyl Phenol

Into a 10-gallon kettle were charged 15 pounds of nonyl phenol and 226.8 grams of 45 percent aqueous potassium hydroxide. The reactor was then purged with prepurified nitrogen. Maintaining a nitrogen purge, the reactor was heated to 110° C. and the initiator sodium hydroxide dried to a water content of less than 0.15 percent using both vacuum and nitrogen stripping. Propylene oxide (53.4 pounds) was then reacted at 110°–115° C. at 60 psig over an 8.5 hour period. The reaction mixture was then digested for two hours to an equilibrium pressure and purged with nitrogen for 15 minutes. The alkaline product was then neutralized at 95° C. by stirring for two hours with 612 grams Magnesol 30/40 adsorbent which was added in an aqueous slurry. Di-t-butyl p-cresol (9.3 grams) was then added to stabilize the product against oxidation. The neutralized product was then vacuum stripped to a minimum pressure at 110° C., nitrogen stripped, and filtered.

Properties of the finished product are given in Table I below.

TABLE I

| Properties | |
|---|---|
| Acid no., mg KOH/g | 0.001 |
| Hydroxyl no. mg KOH/g | 59.2 |
| Unsaturation, meq/g | 0.036 |
| Water, wt. % | 0.04 |
| pH in 10:6 isopropanol-water | 8.3 |
| Color, Pt-Co | 50 |
| Sodium, ppm | 0.5 |
| Potassium, ppm | 3.5 |
| Viscosity, 77° F., μ | 123 |

B. Preparation of Nonylphenoxypolyoxypropylene Amine

To a tubular reactor filled with 1250 milliliters of a nickel catalyst was fed 1.0 lb/hr of the alcohol (Preparation A above), 1.0 lbs/hr of ammonia, and 50 Lhr of hydrogen. The reactor was at 2000 psig and 210° C. The crude reactor effluent was charged to a clean dry kettle. It was then nitrogen stripped to 75° C. then placed under vacuum and heated to 1000° C. The product had the following analysis:

| | meq/gram |
|---|---|
| Total acetylatables | 1.09 |
| Total amine | 1.05 |
| Primary amine | 1.05 |

C. Preparation of the Reaction Product of 4-Methyl-2-Morpholinone and Nonylphenoxypoloxypropylene Amine To a 2-liter, three-necked flask equipped with a thermometer, stirrer, and nitrogen outlet was charged 1099.8 grams of nonylphenoxypolyoxypropylene amine (Preparation B) and 132.8 grams of 4-methyl-2-morpholinone. The mixture was heated to 130° C. for two hours. The resulting product had the following analysis:

| | meq/gram |
|---|---|
| Total acetylatables | 1.09 |
| Total amine | 1.002 | and may be represented by the formula:

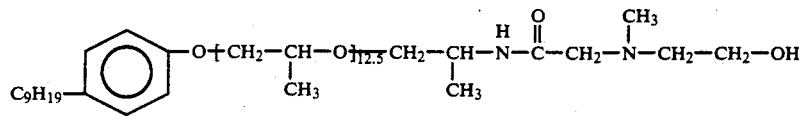

EXAMPLE II

A reaction product was prepared similar to Example I except that 7.5 moles of propylene oxide were reacted with nonylphenol in making Preparation A.

EXAMPLE III

A reaction product was prepared similar to Example I except that 19.5 moles of propylene oxide were employed in the reaction with nonylphenol to make Preparation A.

EXAMPLE IV

A reaction product was prepared similar to Example I except that the morpholinone used was 4-isopropyl-2-morpholinone instead of the 4-methyl analog.

EXAMPLE V

A reaction product was prepared similar to Example I except that Preparation A was made by reacting 13.8 moles of a mixture of ethylene oxide and propylene oxide with nonylphenol.

Honda Generator Test

A test was developed to determine the intake valve detergency of an additive as well as to determine whether the additive will cause the intake valves to stick.

In small four-cylinder gasoline powered intake valves accumulate large amounts of deposits which interfere with the operation of the engine. A good detergent/dispersant is required to prevent the buildup of these deposits. The Honda Generator test was developed to measure the activity of additives in preventing the buildup of intake valve deposits (IVD) (keep clean). The measurements are done in two ways: (1) the intake valves at the end of the run are rated using the CRC method of rating (a valve with a rating of 10 is perfectly clean, and a valve rating of 6 or less denotes heavy deposit levels); and (2) intake valve deposit weights are obtained and also reported in grams.

Test Equipment

The Intake System Deposit/Intake Valve Stickiness Test consists of an electrical generator driven by a current technology gasoline engine, similar in many characteristics to modern vehicle engines. The generator set design allows the engine to be easily loaded by using the electrical generator as a dynamometer for the engine. The set operates at a governed speed of 3600 rpm and incorporates a twin cylinder, overhead camshaft, water-cooled engine described below in Table II.

TABLE II

| Engine Data for ES6500 Honda Generator | |
|---|---|
| Type: 4-stroke | Overhead cam, 2 cylinder |
| Cooling System: | Liquid cooled |
| Displacement: | 359 cc |
| Bore × Stroke: | 58 × 68 mm |
| Construction: | Aluminum head and block, fixed cast iron cylinder liners |
| Compression: | 8.5:1 |
| Maximum Power: | 9.1 Kw/3600 rpm |
| Maximum Torque: | 240 kg-cm |
| Fuel System: | Carburetor |
| Recommended Fuel: | Unleaded gasoline with min 86 (R + M)/2 octane |

The additive of the invention was tested for its effectiveness for keeping intake valves clean in the Honda engine in comparison to a commercial gasoline additive. The evaluation was done using the Cooperative Research Council's (CRC) rating system in which 10 designates clean intake valves. Intake valve deposits (IVD) were also measured in grams. The test fuel of the invention was a premium motor fuel having an octane rating of 87, containing 100 pounds of Example I additive per 1000 barrels of gasoline (PTB) and 100 PTB of a heavy oil (Solvent Neutral Oil having a viscosity of 100 cSt.

The commercial additive was employed in the same motor fuel composition at a concentration of 60 PTB.

The results of these tests are set forth in Table III below.

TABLE III

| | Honda Test Results | |
|---|---|---|
| | Example I | Commercial Additive |
| CRC Valve Rating | 9.8 | 6.03 |
| IVD Weight, grm. | 0.001 | 0.269 |
| Stickiness | None | None |

The motor fuel containing the additive of the invention gave excellent CRC valve ratings, virtually no deposits on the intake valves (1mg less), and inhibited no stickiness. The commercial additive package showed a relatively poor CRC rating and had 269 mg IVD deposits. The commercial additive was free of valve stickiness. In this test, the additive of Example I valve deposit keep clean properties.

The premium motor fuel described above was employed in further Honda Engine studies testing the various additives of the invention. Fuel compositions were prepared and evaluated in two ways (a) neat at 100 PTB, or (b) containing 75 PTB of the particular additive, 50 PTB of Solvent Neutral Oil-600, and 50 PTB of polyoxypropyleneglycol - 1000 molecular weight. Some runs were made using the additive plus heavy oil alone. The engine test involved running the test fuel in the engine for 80 hours. The engine was then dismantled and CRC ratings given for intake valve deposits (IVD), deposits weight, piston crown rating (PC), combustion chamber rating (CC) and a stickiness rating (PUSH) from light (L) to heavy (H). The test results are given in Table IV below.

TABLE IV

| | | Honda Engine Results | | | | |
|---|---|---|---|---|---|---|
| Run | Example | IVD | Wt-g | PC | CC | PUSH |
| 1 | I | 9.15 | 0.005 | 7.6 | 8.3 | L-L |
| 2 | II | 9.0 | 0.013 | 7.7 | 7.6 | L-L |
| 3 | III | 9.3 | 0.08 | 7.3 | 8.3 | L-L |
| 4 | IV | 9.3 | 0.001 | — | — | L-L |
| 5 | V | 9.7 | 0.005 | 7.5 | 8.3 | L-L |
| 6 | I(a) | 9.75 | 0.004 | 7.4 | 8.0 | L-L |
| 7 | II(a) | 9.65 | 0.004 | 7.6 | 8.6 | L-L |
| 8 | I(b) | 9.8 | 0.001 | 7.0 | 7.4 | L-L |

(a) 100 PTB neat additive without solvent neutral oil or polyoxypropyleneglycol; (1000 Mw).
(b) 100 PTB additive plus 100 PTB SNO-850.

The foregoing test results demonstrate the deposit-inhibiting effectiveness of motor fuel compositions containing the novel fuel additive of the invention.

The additive of the invention was tested for the dynamic cleanup of injector deposits. A test was developed using a BMW 318i car equipped with a 1.8 liter, 4-cylinder engine to measure cleanup of injector deposits.

A BMW 318i car was run for 5,000 hours on public roads using a fuel designed to dirty-up intake valves. Then, the car was run an additional 5,000 miles on dirty-up fuel, the intake valves were removed, washed free of oil, and weighed. After the additional 5,000 miles on additive fuel, the intake valves were again removed, washed free of oil, and reweighed. The difference in weights of deposits were obtained. If the intake valves had gained weight (deposit increase), this was reported as a positive value. If the intake valves had lost weight due to deposit removal, this was recorded as a negative value. Table V summarizes results for three runs made using this test procedure.

TABLE V

IVD-BMW 318i Cleanup Studies

| Run | Components | Deposit Cleanup (mg)[1] |
|---|---|---|
| 1 | 100 PTB EDA-PIB Succinimide[2] + 100 PTB Heavy Oil | +13 |
| 2 | 100 PTB Example IV + 100 PTB SNO-850 + 30 PTB, an additive similar to Example I of U.S. Pat. No. 5,061,291 | −65 |
| 3 | 100 PTB Example I + 50 PTB SNO-600 + 50 PTB Polyoxypropylene Glycol (1000 Mw) | −135 |

[1]Positive values are deposit increase on the intake valves and negative values are deposit removal.
[2]The reaction product of ethylene diamine (EDA) with polyisobutylene succinic anhydride to yield polyisobutylene succinimide of EDA with the molecular weight of polyisobutylene (PIB) of 1300.

The injector deposit results demonstrate that the additive of the invention is an excellent additive with respect to cleanup of existing deposits in the BMW 318i engine.

What is claimed is:

1. An amido alkanolamine composition obtained by reacting, at a temperature of 10° C.–200° C.:
   (a) a 4-alkyl-2-morpholinone represented by the formula:

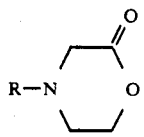

in which R represents a monovalent aliphatic radical having from 1 to 10 carbon atoms, and
   (b) an alkylphenoxypolyoxyalkylene amine represented by the formula:

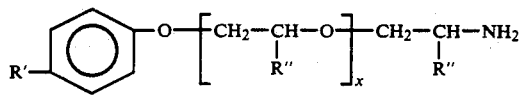

in which R' represents a hydrocarbyl radical having from 4 to 30 carbon atoms, x has a value from 5 to 50, and R" represents a methyl radical or a mixture of hydrogen and methyl radicals.

2. A composition according to claim 1 in which R" represents a methyl radical.

3. A composition according to claim 1 in which R represents an isopropyl radical.

4. A composition according to claim 1 in which R' represents a monovalent aliphatic radical having from 6 to 24 carbon atoms.

5. A composition according to claim 4 in which said aliphatic radical has from 8 to 20 carbon atoms.

6. A composition according to claim 1 in which x has a value from about 6 to 20.

7. A composition according to claim 1 in which the alkylene oxide radical in said alkylphenoxypolyoxyalkylene amine is propylene oxide.

8. A composition according to claim 1 in which the alkylene oxide radical in said alkylphenoxypolyoxyalkylene amine consists of a mixture of propylene oxide and ethylene oxide in a mole ratio range from 2:3 to 9.99:0.01.

9. A composition according to claim 8 in which the mole ratios of propylene oxide to ethylene oxide range from 7:3 to 9.99:0.01.

10. A fuel composition containing from about 0.00015 to 1 weight percent of an amino reaction product prepared by reacting a 4-alkyl-2-morpholinone represented by the formula:

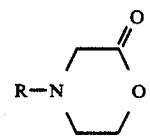

in which R represents a monovalent aliphatic radical having from 1 to 10 carbon atoms, with an alkylphenoxypolyoxyalkylene amine reactant represented by the formula:

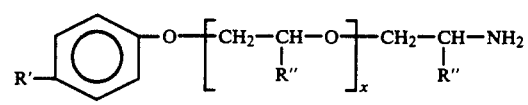

in which R' represents a hydrocarbyl radical having from 4 to 30 carbon atoms, R" represents a methyl radical or a mixture of hydrogen and methyl radicals, and x has a value from 5 to 50.

11. A fuel composition according to claim 10 in which said fuel is a mixture of hydrocarbons in the gasoline boiling range.

12. A method for preparing an amido alkanolamine composition represented by the formula:

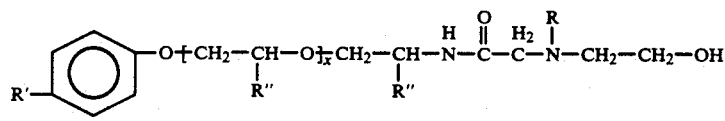

in which R represents a monovalent aliphatic radical having from 1 to 10 carbon atoms, R' represents hydrocarbyl radical having from 4 to 30 carbon atoms, x has a value from 5 to 50, and R" represent a methyl radical or a mixture of hydrogen and methyl radicals in which the ratio of methyl radicals to hydrogen ranges from 2:3 to 9.9:0.01 which comprises reacting a 4-alkyl-2- morpholinone represented by the formula:

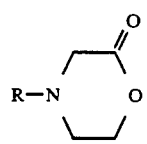
with an alkylphenoxypolyoxyalkylene amine reactant represented by the formula:
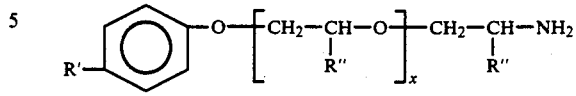
in which R, R', R" and x have the values noted above.
* * * * *